J. P. MANNY.
Harvesters.

No. 135,041.  Patented Jan. 21, 1873.

2 Sheets--Sheet 1.

J. P. MANNY.
Harvesters.

No. 135,041. Patented Jan. 21, 1873.

Witnesses:—

Inventor:—

UNITED STATES PATENT OFFICE.

JOHN P. MANNY, OF ROCKFORD, ILLINOIS.

IMPROVEMENT IN HARVESTERS.

Specification forming part of Letters Patent No. 135,041, dated January 21, 1873.

*To all whom it may concern:*

Be it known that I, JOHN P. MANNY, of Rockford, in the county of Winnebago and State of Illinois, have invented certain new and useful Improvements in Harvesters, of which the following is a specification, reference being had to the accompanying drawing, which represents all the improvements herein claimed as embodied in an improved harvester invented by me.

Some of these improvements, obviously, however, may be used without the others; and they may likewise be adapted to machines differing in construction from the one herein shown.

Figure 1:
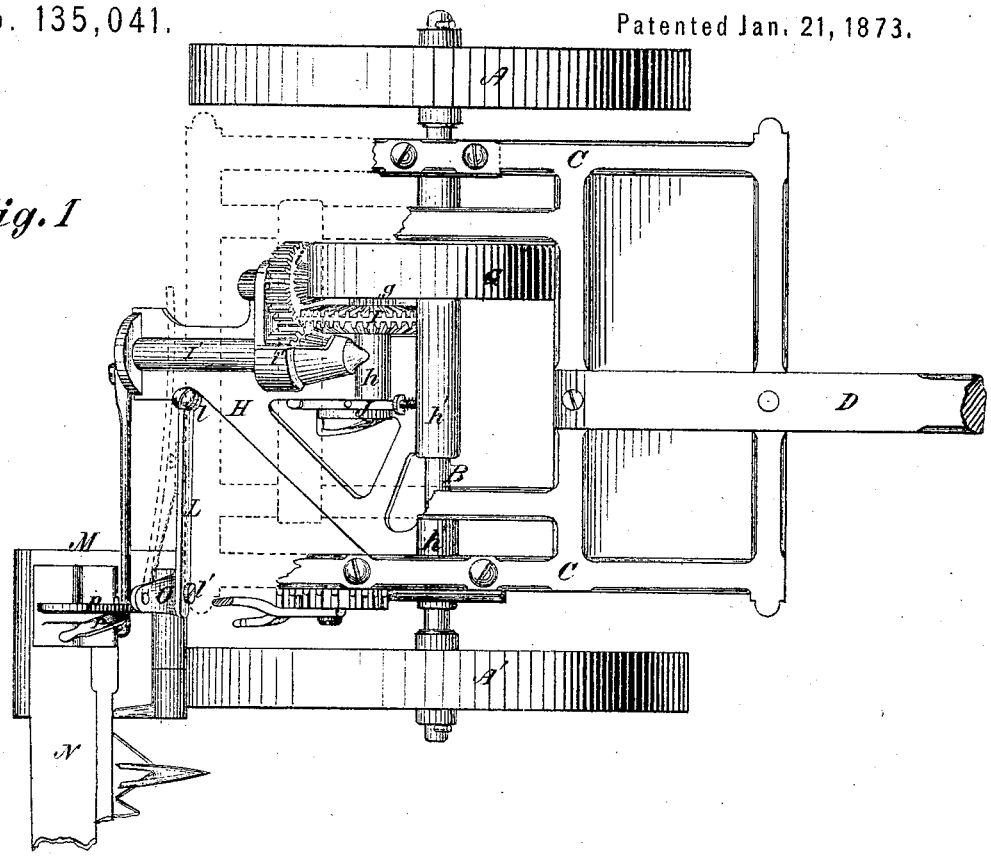
Figure 2:
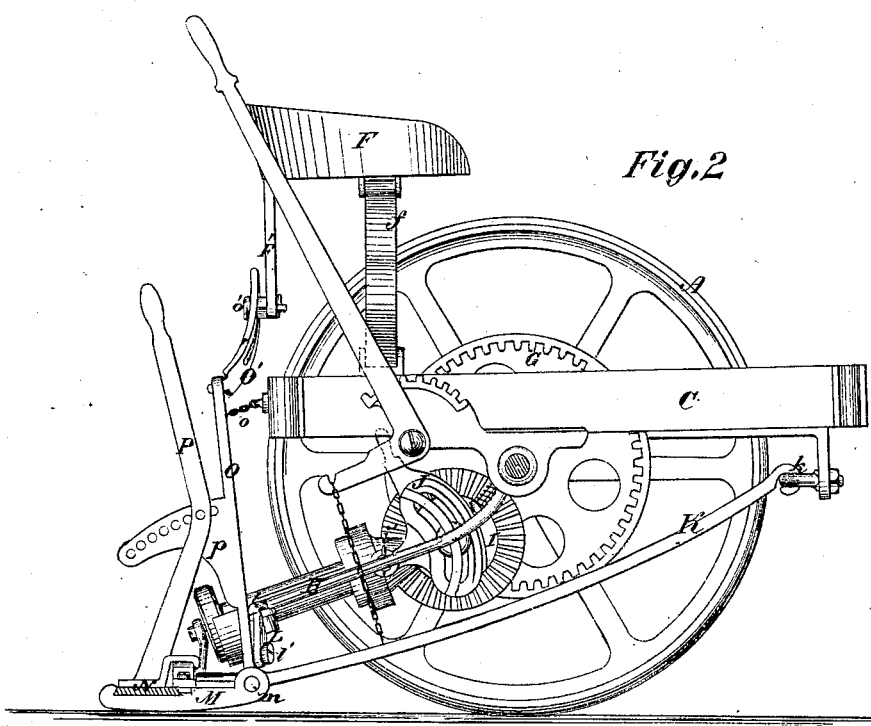
Figure 3:
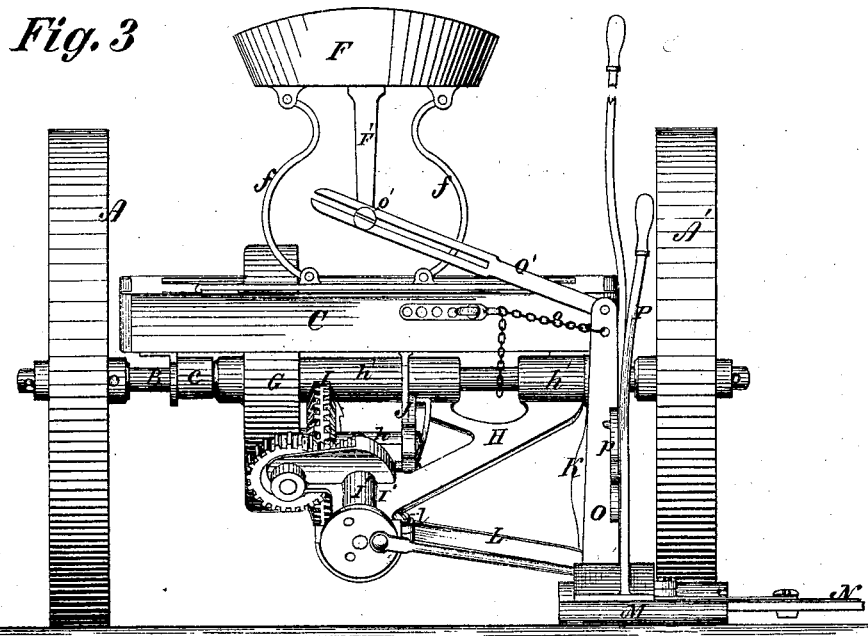
Figure 4:
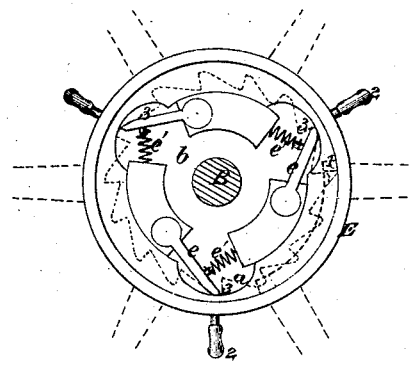
Figure 5:
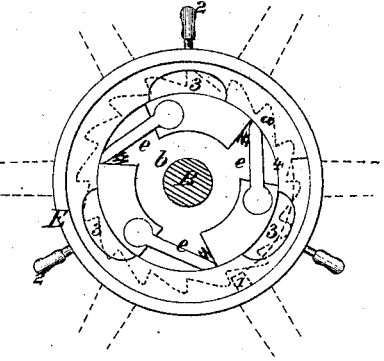

Figure 1 is a plan or top view with the driver's seat and portions of the main frame broken away to show the gear-frame. Fig. 2 is a side elevation with the inner driving-wheel removed to show the gearing. Fig. 3 is a rear elevation. Figs. 4 and 5 show the details of the backing-ratchets, both in and out of gear.

In order to carry out the objects of my invention I mount two driving-wheels, A A', loosely upon an axle, B, turning freely in boxes c on a main frame, C, from which a tongue, D, projects. The driving-wheels are locked upon the axle when moving forward by backing-ratchets of a peculiar construction, which I will now describe: An internal ratchet, a, is formed on the inside of the hub of each driving-wheel. A disk, b, fast on the axle carries pawls e, constantly pressed outward by springs e' into the ratchets. A shipping-ring, E, turns on the disk, being, however, limited in its vibrations by a pin, 1, Figs. 4 and 5, on the disk, which works in a slot in the ring. The ring is turned by the driver by means of pins 2 on its periphery. In this instance three pawls are shown. The inner edge of the ring has a curved recess, 3, cut in it corresponding with each pawl, so that when the recesses are opposite the pawls the latter engage with the ratchets and turn the axle when the machine moves forward, and when the ring is turned so as to bring its inner projections 4 opposite the pawls they are pressed inward out of contact with the ratchet. The wheel then turns freely on the axle. The construction of parts is simple, avoiding the use of slots and pins, and no part of the pawls or ratchets is exposed to obstructing matter from without. A seat, F, for the driver is mounted on arms *f*, hinged to the seat and to the frame in such manner as to allow the seat to swing laterally without disturbing its horizontality, for a purpose hereinafter described. An internally-geared spur-wheel, G, fast on the main axle, drives a spur-pinion, *g*, on a counter-shaft, turning in a box, *h*, on a gear-frame, H, provided with sleeves *h'* at its forward end, through which the main axle passes. The gear-frame swings freely on the main axle. The counter-shaft carries a gear, I, beveled on both faces, and, likewise, moves freely endwise in its bearings, being controlled by a swinging eccentric shipper, J. The bevel-wheel I drives either one of two bevel-pinions, *i i'*, one, *i'*, of which is on a crank-shaft, I', which drives the cutters by a crank and pitman, as usual.

It will be seen that the gearing is a "changeable speed" one; but it need not be described here, as it forms no part of the subject-matter herein claimed, and is fully set forth in another application filed simultaneously with this one, and patented December 12, 1871.

A finger-beam, N, of a well-known construction is secured to a shoe, M, pivoted in front of the front edge of the cutters to a drag-bar, K, by a joint, *m*, parallel with the finger-beam. The drag-bar is pivoted by a swivel, *k*, to the under side of the inner front corner of the main frame. A coupling-arm, L, is pin-jointed at one end to the gear-frame by a vertical pivot, *l*, which forms a joint flexible horizontally, but rigid vertically. The outer end of this coupling-arm is pin-jointed to the rear end of the drag-bar by a horizontal pin, *l'*, which allows the joint free vertical flexure. The gear-frame H, it will be observed, swings on the main axle, while the drag-bar oscillates around a point in front of and eccentric to that axle. The method of pivoting the coupling-arm above described serves two purposes: first, it insures the coincident vertical movements of the drag-bar and gear-frame, as hereinafter described; and, secondly, it compensates the eccentricity of movement of their rear ends caused by their being pivoted at different centers. A post, O, extends upward from the joint *m* of the shoe, and its upper end is connected by a chain, cord, or link, *o*, with the main frame, for a purpose hereinafter explained. A slotted link, O', is also pivoted to this post. An arm, F', projecting from the driver's seat carries a clamp-screw, o', working in the slot of the link. By this device the finger-beam and driver's seat can so be linked together that the driver's seat will vibrate laterally as the finger-beam rises or falls at its outer end, or as the driving-wheels rise or fall laterally, so as to keep the driver undisturbed by the oscillations of the machine. An arm, P, extending upward from the shoe enables the driver to rock the cutting apparatus on its joint $m$, or it may be fastened rigidly by means of a pin passing through a bracket, $p$, on the post O. The cutting apparatus is raised or lowered by a lever pivoted on the main frame and a chain connected with the drag-bar.

In operation the finger-beam can swing on the joint $m$ to raise or lower the points of the guards to conform to the undulations of the ground. It may likewise be rocked by the driver from his seat, or be locked in any desired position by passing a pin through the arm and the bracket on the post O. The finger-beam can also rise or fall freely at either end to conform to the undulations of the ground. As the finger-beam rises the chain $o$ lifts its outer end more rapidly than the inner one. The finger-beam also rocks on the pivot $l'$. The driver's seat also swings laterally on its supports, its linked connections causing it to move in unison with the finger-beam. By inclining the driver's seat inward and clamping it to the slotted link the tendency of the finger-beam to rise is prevented, and by inclining the seat outward beyond its normal position the pressure of the finger-beam upon the ground is diminished. The link L causes the gear-frame and drag-bar to move together.

I claim as my invention—

1. The combination of the gear-frame vibrating about the main axle, the drag-bar vibrating about a pivot eccentric to that of the gear-frame, and the horizontally-flexible coupling-arm connecting the gear-frame and drag-bar, these members being constructed and operating in combination substantially as hereinbefore set forth.

2. The combination of the gear-frame, the drag-bar, the coupling-arm, and the shoe hinged to the drag-bar in front of the cutters, all these members being constructed and operating in combination substantially as hereinbefore set forth.

3. The combination of the shoe, the drag-bar, the coupling-arm, the post mounted on the drag-bar, the main frame, and the chain or cord connecting the post and main frame, all these members being constructed and operating in combination substantially as hereinbefore set forth.

4. The combination of the main frame, the driver's seat oscillating laterally thereon, the hinged finger-beam, and the link connections between the driver's seat and finger-beam, all these members being constructed to operate in combination substantially as hereinbefore set forth, to secure a uniform relation between the driver's seat and finger-beam.

5. The combination of the drag-bar, the shoe hinged to the drag-bar in front of the cutters, and the rocking arm fixed upon the shoe, all these members being constructed to operate in combination substantially as hereinbefore set forth, to rock the finger-beam independently of the coupling-arm.

6. The combination of the drag-bar, the post mounted thereon, bracket on the post, the shoe hinged to the drag-bar, and the rocking arm mounted on the shoe, all these members being constructed to operate in combination substantially as hereinbefore set forth, to lock the finger-beam when desired.

7. The combination of the driving-wheel carrying an internal ratchet, the disk fast on the axle and carrying spring-pawls, and the oscillating recessed shipping-ring encircling the disks, these members being constructed and operating as described.

In testimony whereof I have hereunto subscribed my name.

JOHN P. MANNY.

Witnesses:
 JOE I. PEYTON,
 BALTIS DE LONG.